United States Patent [19]

Ogoe et al.

[11] Patent Number: 4,727,101

[45] Date of Patent: Feb. 23, 1988

[54] IGNITION RESISTANT CARBONATE POLYMER WITH IMPROVED PROCESSING STABILITY

[75] Inventors: Samuel A. Ogoe, Angleton; Hani Farah, Clute; Kevin F. Dick; Grace M. Willis, both of Lake Jackson, all of Tex.

[73] Assignee: The Dow Chemical Company, Midland, Mich.

[21] Appl. No.: 878,928

[22] Filed: Jun. 26, 1986

Related U.S. Application Data

[63] Continuation-in-part of Ser. No. 701,838, Feb. 14, 1985, abandoned.

[51] Int. Cl.$^4$ ............................ C08K 5/47; C08K 5/43
[52] U.S. Cl. .................................... 524/83; 524/101; 524/159; 524/167; 524/168; 524/281
[58] Field of Search ................. 524/281, 167, 168, 83, 524/159, 101

[56] References Cited

U.S. PATENT DOCUMENTS

| | | | |
|---|---|---|---|
| 4,254,015 | 3/1981 | Thomas et al. | 524/169 |
| 4,263,201 | 4/1981 | Mark | 524/161 |
| 4,444,978 | 4/1984 | Dick et al. | 524/167 |
| 4,486,560 | 12/1984 | Thomas | 524/169 |

Primary Examiner—Veronica P. Hoke

[57] ABSTRACT

A carbonate polymer composition comprising a carbonate polymer such as a bisphenol-A homopolycarbonate which carbonate polymer contains an amount of a salt represented by the formula:

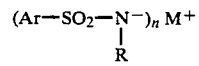

wherein Ar is an aromatic group, R is a monovalent organic moiety, or Ar and R collectively are a divalent aromatic moiety M is a cation, and n is a number corresponding to the valence of M and an amount of a free aromatic sulfimide, which carbonate polymer composition resists combustion upon exposure to an ignition source, exhibits good optical properties, and exhibits molecular weight stability. Optionally, a halogenated organic compound may be added to the composition.

17 Claims, No Drawings

IGNITION RESISTANT CARBONATE POLYMER WITH IMPROVED PROCESSING STABILITY

CROSS-REFERENCE TO RELATED APPLICATION

This is a continuation-in-part of application Ser. No. 701,838; filed Feb. 14, 1985; now abandoned.

BACKGROUND OF THE INVENTION

This invention relates to carbonate polymer compositions containing additives which act as flame retardants.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. As a result, the modified carbonate polymers frequently exhibit substantially poorer resistance to combustion than does the unmodified carbonate polymer.

In attempts to increase the combustion resistance of carbonate polymers including the modified forms thereof, it has been a common practice to employ monomeric phosphites, phosphoric acid esters, thiophosphoric acid esters containing halogenated alkyl radicals and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

It is also known that oligomeric compounds having the general formula:

wherein R is the divalent residue of a dihydric mononuclear phenol or dihydric polynuclear phenol, $R_1$ is an alkyl, aralkyl, or alkaryl group having 1 to 25 carbons, and n is a number having an average value of 1–200, impart improved thermal stability to carbonate polymers copolymerized with such oligomeric compounds. Such compositions are described in more detail in U.S. Pat. No. 4,444,978.

Recently, for example as taught in U.S. Pat. No. 4,254,015; metal salts of aromatic sulfonamides are employed as fire retardant additives in order to retard the combustion of carbonate polymers which are exposed to a low temperature ignition source. Unfortunately, the use of such salts as ignition resistant additives to carbonate polymers can adversely affect the processing stability of the carbonate polymer. As a result, carbonate polymers containing such ignition resistant salt additives can exhibit undesirable molecular weight degradation and can adversely affect optical properties.

In view of the deficiencies of the conventional fire retardant carbonate polymer compositions, it would be highly desirable to provide a carbonate polymer composition having improved resistance to burning when exposed to an ignition source, and which composition exhibits good molecular weight stability and optical stability upon processing.

SUMMARY OF THE INVENTION

The present invention is a carbonate polymer composition comprising a carbonate polymer having dispersed therein (1) a salt represented by the formula:

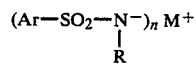

wherein Ar is an aromatic group, R is a monvalent organic moiety or Ar and R collectively are a divalent aromatic moiety, M is a cation, and n is a number corresponding to the valence of M, in an amount sufficient to retard combustion when the composition is exposed to an ignition source, and (2) a functionally effective amount of a free aromatic sulfimide, said free aromatic sulfimide and amount thereof being selected to provide a desirable degree of molecular weight stability to the carbonate polymer composition upon thermal processing thereof.

In another aspect, the present invention is the aforementioned carbonate polymer composition which further, comprises a functionally effective amount of a halogenated organic compound.

In yet another aspect, the present invention is a poly(ester carbonate)-co-phosphite having dispersed therein a salt represented by the formula set forth above.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731; 4,330,662; 4,360,656; 4,374,973; 4,225,556; 4,388,455; 4,355,150 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

Additionally, in one embodiment of the present invention, it is desirable to employ a carbonate polymer prepared by incorporating into the polymer chain an oligomer having the formula:

wherein R is the divalent residue of a dihydric phenol or a dihydric polynuclear phenol, $R_1$ is an alkyl, aralkyl or alkaryl group having 1 to 25 carbon atoms and n is a number having an average value of 1–200. Such carbonate polymers and their methods of preparation are described in detail in U.S. Pat. No. 4,444,978, the teachings of which are incorporated herein by reference.

The carbonate polymers described above have dispersed therein a salt represented by the formula:

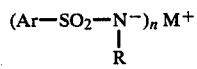

wherein Ar is an aromatic group, R is a monovalent organic moiety or Ar and R collectively are a divalent aromatic moiety, M is a cation and n is a number corresponding to the valence of M. It is desirable that R be a monovalent organic moiety containing a sulfonyl or carbonyl group or that Ar and R are collectively a divalent aromatic moiety, especially one containing a carbonyl or sulfonyl group, both valencies of which divalent moiety are bonded to the anionic nitrogen. It is desirable that M is a monovalent cation.

Exemplary of salts described by the formula:

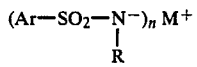

are compositions wherein Ar is phenyl, aromatically substituted phenyl, phenylene, or aromatically substituted phenylene wherein the substituent(s) are halo, alkyl, aryl, amino, including N-alkylamino and N-N-dialkyl amino, alkyl carbonyl, alkaryl, aralkyl, and the like; R is carbonyl, arylcarbonyl (e.g., benzoyl), arylaminocarbonyl, aralkylaminocarbonyl (e.g., benzylaminocarbonyl), arylsulfonyl (e.g., tolylsulfonyl), thiazolyl including alkylthiazolyl, pyrimidinyl including alkyl pyrimidinyl, quinolinyl and pyrrolidinyl, thiadiazolyl including alkyl thiadiazolyl, etc.; and M is an alkali metal cation.

Preferably, the salt is selected from the group consisting of the alkali metal salts of saccharin, N-(p-tolylsulfonyl)-p-toluenesulfonamide, N-(N'-benzylaminocarbonyl)-sulfanilamide, N-(phenylcarboxyl)-sulfanilamide, N-(2-pyrimidinyl)sulfanilamide, N-(2-thiazolyl)-sulfanilamide, and other salts disclosed in U.S. Pat. No. 4,254,015; which is hereby incorporated by reference. Combinations of the disclosed salts can also be employed.

The salts described above are present in an amount sufficient to retard combustion of the carbonate polymer composition when said composition is exposed to an ignition source. It is desirable that said salts be present in an amount sufficient to retard combustion of the composition and maintain an acceptable level of stability and optical clarity. Generally, the salts will be present in the compositions according to the present invention in an amount of from about 0.001 to about 2.0 weight percent, preferably from about 0.01 to about 0.5 weight percent based on total weight of carbonate polymer present in the carbonate polymer composition.

The halogenated organic compound can be virtually any halogenated organic compound commonly used as a fire retardant additive. A functionally effective amount of halogenated organic compound is that amount which provides fire retardant character to the carbonate polymer. The preferred compounds are the halo-substituted aromatic compounds (halo is fluoro, chloro, or bromo). Suitable compounds include, for example, decabromo diphenyloxide, tris(tribromophenoxy)triazine, decabromo diphenyl carbonate, a tetrafluoroethylene polymer, an oligomer or polymer of tetrabromobisphenol A, and a copolymer of bisphenol A/tetrabromobisphenol A. Combinations of the above-identified compounds can be employed. Examples of other suitable monomeric and polymeric halogenated compounds are disclosed in U.S. Pat. No. 4,263,201, which is incorporated herein by reference, such compounds are: (1) a monomeric halogenated compound of the formula:

in which X is chlorine or bromine, m is an integer from 1 to the number of replaceable hydrogen atoms on the monomeric halogenated compound and R" is an organo radical derived from aliphatic or cycloaliphatic hydrocarbons of from 6 to 20 carbons, an aromatic hydrocarbon containing from 6 to 10 carbons, biphenyl, diphenyl ether, diphenylsulfone, diphenyl carbonate, a bisphenol, 1,2-diphenoxyethane, or a Diels-Alder adduct of hexachloropentadiene and an olefin, a diene, or other dienophile; or (2) a halogenated oligomer, homopolymer, or copolymer derived form a polyolefin, polystyrene or a bisphenol compound in the form of a polyester or a polycarbonate, and are recited in Col. 3, lines 1–17 of U.S. Pat. No. 4,263,201.

The halogenated organic compound optionally present in the compositions of the present invention provide additional flame retardancy to the compositions. Any amount of halogenated organic compound which amount increases the flame retardancy of the compositions is suitable for use in the present invention. Desirably the halogenated organic compound will be present in the compositions of the present invention in an amount of from 0 to about 20, preferably from about 0.01 to about 10 and most preferably from about 0.01 to about 5 weight percent based on total weight of carbonate polymer to which the halogenated organic compound is added.

The free aromatic sulfimide of this invention is suitably any free sulfimide compound in acid form. Desirably, such a compound is one which is capable of introducing a buffering character to the carbonate polymer composition containing an amount of the aforementioned salt. Typically, the pKa of the sulfimide compound ranges from about 1 to about 3. Preferred free aromatic sulfimide are the sulfonamides and sulfanilamides. Exemplary of such sulfimides and sulfanilamides are N-(p-tolylsulfonyl)-p-toluenesulfonamide; saccharin; N-(N-'-benzylaminocarbonyl)sulfanilamide; N-(phenylcarbonyl)-sulfanilamide; and the like. Such free aromatic sulfimides are advantageously represented by the formula:

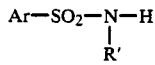

where Ar is an aromatic group and R' is carbonyl; arylcarbonyl (e.g., benzoyl), arylaminocarbonyl aralkylaminocarbonyl (e.g., benzylaminocarbonyl), or arylsulfonyl (e.g., tolylsulfonyl). A functionally effective amount of the free aromatic sulfimide component provides a desirable degree of molecular weight stability and maintains the desirable optical properties of the carbonate polymer composition. The free sulfimide is suitably present in an amount of from about 0.001 to about 10, desirably from about 0.001 to about 5.0, beneficially from about 0.001 to about 2, preferably from about 0.01 to about 0.5 weight percent based on total weight of the carbonate polymer to which the free sulfimide is added.

The carbonate polymer compositions of the present invention are suitably prepared by blending the various components of the composition through blending procedures conventionally employed for incorporating additives into carbonate polymer resins. For example, dry particulates of the carbonate polymer, the salt, and the free aromatic sulfimide can be dry blended and the resulting dry blend extruded and molded into the desired shape. It is understood that any method of blending which results in the salt and free aromatic sulfimide being substantially uniformly dispersed in the carbonate polymer is suitable for use in forming the compositions of the present invention.

In addition to the aforementioned fire retardant additives, other additives can be included in the carbonate polymer composition of the present invention such as glass fibers, pigments, dyes, antioxidants, stabilizers, ultraviolet light absorbers, mold release agents and other additives commonly employed in carbonate polymer compositions.

In one preferred embodiment of the present invention, the carbonate polymer employed is a homopolymer of 2,2-bis(4-hydroxyphenyl)propane (Bisphenol A) and has dispersed therein the potassium salt of N-(p-tolylsulfonyl)-p-toluenesulfonamide and free N-(p-tolylsulfonyl)-p-toluenesulfonamide.

In a second preferred embodiment of the present invention, the carbonate polymer employed is a homopolymer of 2,2-bis(4-hydroxyphenyl)propane (Bisphenol A) and has dispersed therein the potassium salt of N-(p-tolylsulfonyl)-p-toluene sulfonamide, free N-(p-tolylsulfonyl)-p-toluenesulfonamide, and a phenoxy terminated tetrabromo bisphenol-A carbonate oligomer.

In a third preferred embodiment of the present invention, the carbonate polymer is a poly(ester carbonate)-co-phosphite having dispersed therein the potassium salt of N-(p-tolylsulfonyl)-p-toluenesulfonamide. As indicated above, when a poly(ester carbonate)-co-phosphite is employed as the carbonate polymer advantageous results are obtained with the only additive being the salt represented by the formula

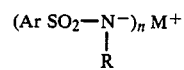

wherein Ar, R, $M^+$ and n are as previously defined. Nonetheless, additional benefits can be obtained by incorporating an amount of the free sulfimide in the carbonate polymer compositions.

The following examples are given to further illustrate the invention and should not be construed as limiting its scope. In the following examples, all parts and percentages are by weight unless otherwise indicated.

EXAMPLE 1

Samples are prepared using a bisphenol-A polycarbonate pellet heat stabilized with an organo phosphorus compound as described in U.S. Pat. No. 4,474,937, along with 0.06 percent of free N-(p-tolyl sulfonyl)-p-toluenesulfonamide (HPTSM), 0.6 percent phenoxy terminated tetrabromo bisphenol-A carbonate oligomer having an average of 5 repeating units (TBBPAC), and 0.06 percent of the potassium salt of N-(tolylsulfonyl)-p-toluenesulfonamide (KPTSM). The components are mixed for about 5 minutes and the mixture is extruded into pellets at 550° F. on a twin screw extruder. The pellets are dried on a force draft oven at 250° F. The sample is designated as Sample No. 1. A portion of the resulting sample is subjected to melt shearing at 540° F. by a torque rheometer for over 30 minutes. The initial and final molecular weight of the sample so treated is presented in Table I. The remainder of the sample is injection molded at 575° F. into bars and disks for flammability and optical properties.

In a similar manner is prepared and evaluated Sample No. 2 which comprises the heat stabilized polycarbonate, 0.06 percent KPTSM, 0.09 percent HPTSM and 0.6 percent TBBPAC.

In a similar manner is prepared and evaluated Sample No. 3 which comprises the heat stabilized polycarbonate, 0.06 percent KPTSM, 0.12 percent HPTSM and 0.6 percent TBBPAC.

In a similar manner is prepared and evaluated Sample No. C-1 which is the best stabilized polycarbonate. This sample is prepared for comparison purposes.

In a similar manner is prepared and evaluated Sample No. C-2 which is the heat stabilized polycarbonate, 0.06 percent KPTSM and 0.6 percent TBBPAC. This sample is prepared for comparison purposes.

Data for all the samples are presented in Table I.

TABLE I

| Sample No. | Polycarbonate Molecular Weight | | | UL-94 Test[1] | | | Optical Properties[2] | |
|---|---|---|---|---|---|---|---|---|
| | Initial | Final | Change | Avg. T. (sec) | No. Drips | Rating | YI | Trans. (Percent) | Haze (Percent) |
| 1 | 27,200 | 25,300 | 1,900 | 1.7 | 0/5 | V-0 | 2.7 | 90.2 | 1.7 |
| 2 | 27,200 | 25,400 | 1,800 | 1.5 | 0/5 | V-0 | 2.6 | 90.2 | 1.8 |
| 3 | 27,100 | 25,600 | 1,500 | 1.4 | 0/5 | V-0 | 1.5 | 90.3 | 1.9 |
| C-1* | 27,250 | 25,800 | 1,470 | 10 | 5/5 | V-2 | 2.5 | 90.3 | 1.4 |

TABLE I-continued

| Sample No. | Polycarbonate Molecular Weight | | | UL-94 Test[1] | | | Optical Properties[2] | | |
|---|---|---|---|---|---|---|---|---|---|
| | Initial | Final | Change | Avg. T. (sec) | No. Drips | Rating | YI | Trans. (Percent) | Haze (Percent) |
| C-2* | 27,000 | 21,000 | 6,000 | 2.6 | 0/5 | V-0 | 2.8 | 89.9 | 1.4 |

*Not an example of the invention.
[1]Tests are performed on a ⅛ inch molded bar. Avg. T. is the average flame time in seconds for 5 bars. No. Drips is the number of bars that drip per 5 bars tested.
[2]YI is yellowness index; Trans (percent) is percent transmittance; Haze (percent) is percent haze.

The data in Table I indicate that Sample Nos. 1, 2 and 3 exhibit good ignition resistant properties. Sample Nos. 1, 2 and 3 exhibit improved processing stability as indicated by the low change in molecular weight. Correspondingly, Sample No. C-2 exhibits a large change in molecular weight upon evaluations. Sample Nos. 1, 2 and 3 exhibit compatibility of the HPTSM with the carbonate polymer as is illustrated by the negligible change in optical properties of the samples over an untreated sample such as Sample No. C-1.

What is claimed is:

1. A carbonate polymer composition comprising a carbonate polymer having dispersed therein
   (1) a salt represented by the formula:

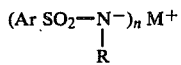

wherein Ar is an aromatic group, R is a monovalent organic moiety or Ar and R collectively are a divalent aromatic moiety, M is a cation, and n is a number corresponding to the valence of M, in an amount sufficient to retard combustion when the composition is exposed to an ignition source, and
   (2) a functionally effective amount of a free aromatic sulfimide said free aromatic sulfimide and amount thereof being selected to provide a desirable degree of molecular weight stability to the carbonate polymer composition upon thermal processing thereof.

2. The composition of claim 1, wherein said carbonate polymer is a homopolycarbonate of 2,2-bis(4-hydroxyphenyl)propane.

3. The composition of claim 1, wherein said free aromatic sulfimide is a free aromatic sulfonamide or sulfanilamide.

4. The composition of claim 1, wherein said free aromatic sulfimide exhibits a pKa of from about 1 to about 3.

5. The composition of claim 1, wherein the salt is present in an amount of from about 0.001 to about 10 weight percent and the free sulfimide is present in an amount of from about 0.001 to about 2 weight percent, based on the total weight of carbonate polymer.

6. The composition of claim 1, wherein the salt is present in an amount of from about 0.01 to about 0.5 weight percent and the free aromatic sulfimide is present in an amount of from about 0.01 to about 0.5 weight percent, based on the total weight of carbonate polymer.

7. The composition of claim 3, wherein the free aromatic sulfimide is represented by the formula:

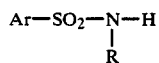

wherein Ar is an aromatic group and R is carbonyl, aryl carbonyl, aralkylamino carbonyl, arylaminocarbonyl or aryl sulfonyl.

8. The composition of claim 3, wherein the salt is the potassium salt of N-(p-tolylsulfonyl)-p-toluenesulfonamide and the free aromatic sulfimide is N-(p-tolylsulfonyl)-p-toluenesulfonamide.

9. The composition of claim 1 which further comprises a flame retardant effective amount of a halogenated organic compound which is (1) a monomeric halogenated compound of the formula:

$$R''(X)_m$$

in which X is chlorine or bromine, n is an integer from 1 to the number of replaceable hydrogen atoms on the monomeric halogenated compound and R'' is an organo radical derived from aliphatic or cycloaliphatic hydrocarbons of from 6 to 20 carbons, an aromatic hydrocarbon containing from 6 to 10 carbons, biphenyl, diphenyl ether, diphenylsulfone, diphenyl carbonate, a bisphenol, 1,2-diphenoxyethane, or a Diels-Alder adduct of hexachloropentadiene and an olefin, a diene, or other dienophile; (2) a halogenated oligomer, homopolymer, or copolymer derived from a polyolefin, polystyrene or a bisphenol compound in the form of a polyester or a polycarbonate; or (3) tris(tribromophenoxy)triazine.

10. The composition of claim 3 which further comprises a flame retardant effective amount of halogenated organic compound which is (1) a monomeric halogenated compound of the formula:

$$R''(X)_m$$

in which X is chlorine or bromine, m is an integer from 1 to the number of replaceable hydrogen atoms on the monomeric halogenated compound and R'' is an organo radical derived from aliphatic or cycloaliphatic hydrocarbons of from 6 to 20 carbons, an aromatic hydrocarbon containing from 6 to 10 carbons, biphenyl, diphenyl ether, diphenylsulfone, diphenyl carbonate, a bisphenol, 1,2-diphenoxyethane, or a Diels-Alder adduct of hexachloropentadiene and an olefin, a diene, or other dienophile; (2) a halogenated oligomer, homopolymer, or copolymer derived from a polyolefin, polystyrene or a bisphenol compound in the form of a polyester or a polycarbonate; or (3) tris(tribromophenoxy)triazine.

11. The composition of claim 9, wherein said halogenated organic compound is a halogenated aromatic compound.

12. The composition of claim 1, wherein the carbonte polymer is a poly(ester carbonate)-co-phosphite.

13. The composition of claim 3, wherein the carbonate polymer is a poly(ester carbonate)-co-phosphite.

14. The composition of claim 5, wherein the carbonate polymer is a poly(ester carbonate)-co-phosphite.

15. A carbonate polymer composition comprising a carbonate polymer having dispersed therein (1) a salt represented by the formula:

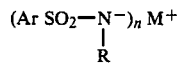

wherein Ar is an aromatic group, R is a monovalent organic moiety or Ar and R collectively are a divalent aromatic moiety, M is a cation, and n is a number corresponding to the valence of M; in an amount of from about 0.001 to about 2 weight percent;

(2) from about 0.001 to about 2 weight percent of a free aromatic sulfimide; and (3) from about 0 to about 20 weight percent of a halogenated organic flame retardant compound, all weights based on the total amount of carbonate polymer.

16. The composition of claim 15, wherein the salt is present in an amount of from about 0.01 to about 0.5 weight percent, the free aromatic sulfimide is present in an amount of from about 0.01 to about 0.5 weight percent, and the halogenated organic compound is present in an amount of from 0.01 to about 10 weight percent, all weights based on the total weight of the carbonate polymer.

17. The composition of claim 16, wherein said carbonate polymer is a poly(ester carbonate)-co-phosphite.

UNITED STATES PATENT AND TRADEMARK OFFICE
CERTIFICATE OF CORRECTION

PATENT NO. : 4,727,101

DATED : February 23, 1988

INVENTOR(S) : Samuel A. Ogoe, Hani Farah, Kevin F. Dick and Grace M. Willis

It is certified that error appears in the above-identified patent and that said Letters Patent is hereby corrected as shown below:

Column 4, line 39, "recited in Col. 3," should read --recited at Col. 3,--.

Column 4, line 65, "N-(N-'-benzylaminocarbonyl)sulfanil-amide;" should read --N-(N'-benzylaminocarbonyl)sulfanilamide;--.

Column 6, line 49, "best" should read --heat--.

Column 7, lines 26 to 29, the formula should read $$-- (Ar\ SO_2\text{-}N^-)_n M+ \quad --.$$
$$\quad\quad\quad\ \ |$$
$$\quad\quad\quad\ \ R$$

Column 8, Claim 9, line 25, "n" should read --m--.

Column 8, Claim 12, line 61, "carbonte" should read --carbonate--.

Column 9, Claim 15, the formula should read $$-- (Ar\ SO_2\text{-}N^-)_n M+ \quad --.$$
$$\quad\quad\quad\ \ |$$
$$\quad\quad\quad\ \ R$$

Signed and Sealed this

Twenty-second Day of November, 1988

Attest:

DONALD J. QUIGG

Attesting Officer      Commissioner of Patents and Trademarks